No. 858,598. PATENTED JULY 2, 1907.
C. U. HAYNES.
DRIVING MECHANISM FOR MOTOR CARRIAGES.
APPLICATION FILED MAY 14, 1906.
2 SHEETS—SHEET 1.
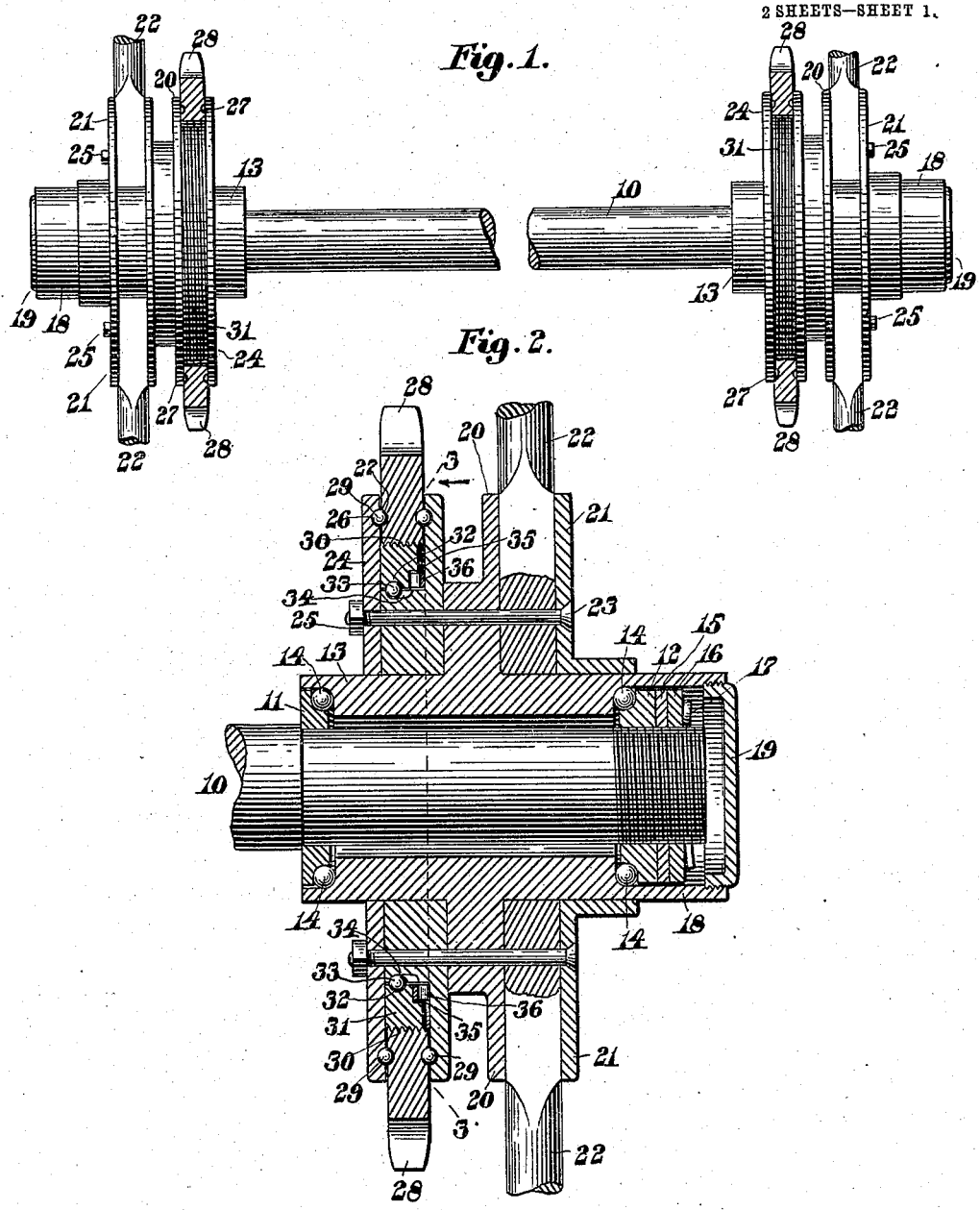
Witnesses:
Nathan C. Lombard
Edna C. Cleveland
Inventor:
Clarence U. Haynes,
by Walter E. Lombard,
Atty.

No. 858,598. PATENTED JULY 2, 1907.
C. U. HAYNES.
DRIVING MECHANISM FOR MOTOR CARRIAGES.
APPLICATION FILED MAY 14, 1906.
2 SHEETS—SHEET 2.

Witnesses:
Nathan C. Lombard
Edna L. Cleveland

Inventor:
Clarence U. Haynes,
by Walter E. Lombard,
Atty.

UNITED STATES PATENT OFFICE.

CLARENCE U. HAYNES, OF ROME, NEW YORK.

DRIVING MECHANISM FOR MOTOR-CARRIAGES.

No. 858,598.   Specification of Letters Patent.   Patented July 2, 1907.

Application filed May 14, 1906. Serial No. 316,791.

*To all whom it may concern:*

Be it known that I, CLARENCE U. HAYNES, a citizen of the United States of America, and a resident of Rome, in the county of Oneida and State of New York, have invented certain new and useful Improvements in Driving Mechanisms for Motor-Carriages, of which the following is a specification.

This invention relates to driving mechanisms for motor vehicles and has for its object the production of a device in which the vehicle wheels are freely revoluble upon a stationary axle and are driven independently by means of a suitable driving member such as a gear or sprocket wheel, the hubs of said wheels being provided with mechanism whereby they may be driven in unison in either direction when the vehicle is moving ahead or to the rear, or independently of each other when the vehicle is making a turn.

Figure 3:
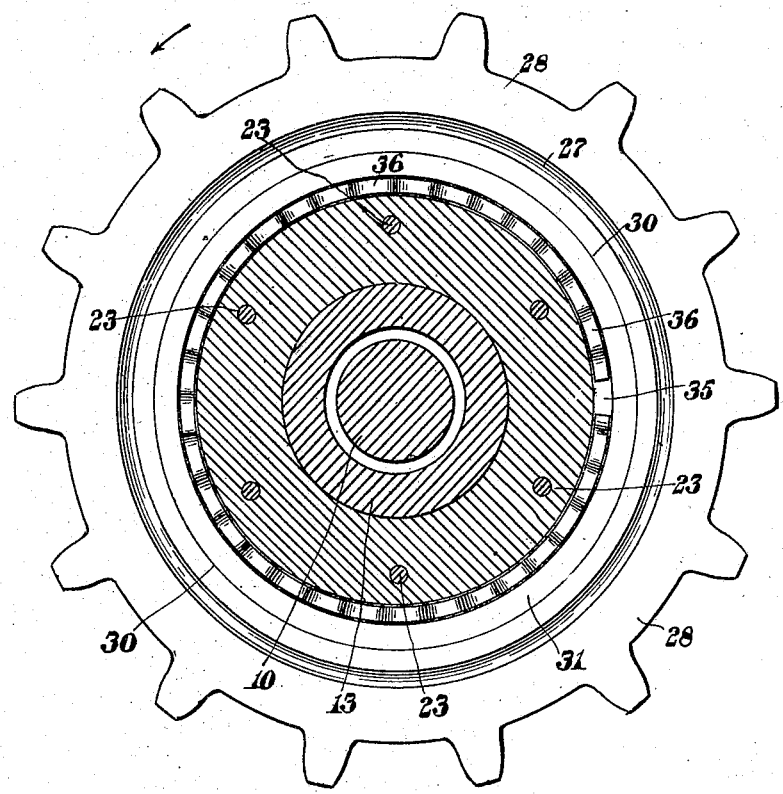
Figure 4:
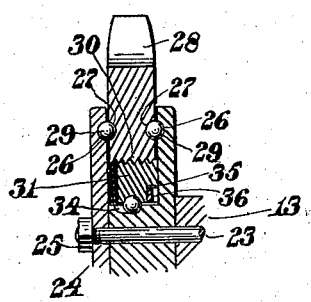

Of the drawings: Figure 1 represents a plan of a rear axle for a motor vehicle, showing the hubs of the driving wheels applied thereto, some of the spokes of said wheels being omitted and the driving member being shown in section. Fig. 2 represents a section of a wheel hub mounted upon one end of an axle and the driving mechanism therefor. Fig. 3 represents a section on line 3—3 on Fig. 2, looking in the direction of the arrow, and Fig. 4 represents a similar section to that of Fig. 2, showing a portion of the driving mechanism with the friction member thereof in its opposite position.

Similar characters designate like parts throughout the several figures of the drawings.

In the drawings, 10 represents a rear axle of a motor vehicle the outer ends of which are provided with the cone members 11—12 between which and the wheel hub 13 are interposed a plurality of anti-friction members 14 upon which the wheel hub 13 is free to revolve about the axle 10. A suitable washer 15, nut 16 and cotter pin 17 retain the cones 11—12 in adjusted position in a well-known manner. The wheel hub 13 is provided with an outwardly extending axial flange 18 surrounding the end of the axle and to the extreme end thereof is threaded a dust cap 19.

The wheel hub 13 is provided with an outwardly extending radial flange 20 and a parallel flanged member 21 between which the spokes 22 are clamped in position, said member 21 being secured to said wheel hub by means of the bolts 23 extending through the same and through the grooved member 24. The opposite end of the bolt 23 is threaded and provided with a nut 25. The member 24 is made in two parts for convenience and each inner face of the groove of said member is provided with an annular channel or raceway 26 corresponding in diameter with the annular channels 27 in a driving member 28 such as a gear or sprocket wheel mounted in the groove of said member 24. The driving member 28 is somewhat narrower than the groove of said member 24 and interposed between the flanges of said member 24 and the faces of said driving member are a plurality of anti-friction members 29 mounted in said channels or raceways 26—27 so that said driving member may be freely revoluble thereon within said groove. The inner periphery of said driving member is threaded, as at 30, said threads engaging with co-acting threads upon the outer periphery of the friction member or ring 31, the inner periphery of which is provided with a raceway or channel 32 in which rests a plurality of anti-friction members 33, said members also resting in a wider channel or race-way 34 in the bottom of the groove of said member 24. At 35 said member 31 is cut away to receive a corrugated annular split ring 36 adapted to restrain the free rotation of the member 31 and cause it to be acted upon by the movement of the driving member 28 to cause a movement of said slidable member longitudinally of the axle 10. The threads upon the member 31 are inclined in opposite directions and are so arranged that a movement of the driving member in the direction of the arrow indicated on Fig. 3 will cause the slidable friction member 31 to be moved into the position shown in Fig. 4 where the strain upon the driving member 28 will retain said friction member in firm contact with the flange of the grooved member 24 and cause a wheel hub 13 to be moved about the axle 10 to move the vehicle ahead. When the driving member 28 is moved in the direction opposite to the arrow shown in Fig. 3 the action of the threads upon the inner periphery of said driving member will act upon said slidable member to cause it to be moved into the opposite position, as shown in Fig. 2, the strain upon said driving member forcing the lefthand face of said member into firm contact with the lefthand flange of the grooved member 24 and causing a backward movement of the vehicle.

It is obvious that the inclination of the threads between the driving member 28 and friction member 31 may be reversed without altering the principles of this invention or the action of the mechanism, the only result being a reversal of movement of the friction member 31.

When the vehicle is running around a curve the inside wheel maintains its normal speed while the outside wheel necessarily runs faster than the inside wheel and in so doing the outside wheel freely revolving on the axle 10 causes the threads upon its slidable member 31 to so act upon the driving member 28 as to move it from contact with the face of the grooved member 24 thereby permitting said outer wheel to turn freely on the anti-friction members 14 entirely independently of the driving member 28. This makes a very convenient construction for driving a motor vehicle, permitting as it does a direct drive upon the wheel hub which may readily be reversed to back the vehicle and which will automatically permit the outside wheel to accommodate itself to the speed of the vehicle in making a curve, thereby obviating skidding which is very objectionable and oftentimes materially injures the vehicle.

From the foregoing description it is believed that the operation of the invention will be thoroughly understood.

Claims.

1. The combination with an axle; of a wheel hub revoluble on each end thereof; a driving member freely revoluble on said hub; and means interposed between said hub and driving member whereby the former may be driven by the latter in either direction or rotate independently thereof.

2. The combination with an axle; of a wheel hub revoluble on each end thereof provided with parallel friction plates; a freely revoluble driving member interposed between said plates provided with an engaging thread; and a member engaging said thread and movable thereby from one plate to the other or to a position intermediate thereof.

3. The combination with an axle; of a wheel hub revoluble on each end thereof provided with parallel friction plates; a freely revoluble driving member interposed between said plates provided with an engaging thread; a member engaging said thread and movable thereby from one plate to the other or to a position intermediate thereof; and means engaging said movable member adapted to retain it in its normal position.

4. The combination with an axle; of a wheel hub revoluble on each end thereof provided with parallel friction plates provided with engaging threads; a spring member engaging said movable member adapted to retain it in its normal position; and a member engaging said threads and movable thereby from one plate to the other or to a position intermediate thereof.

5. The combination with an axle; of a wheel hub revoluble on each end thereof; a slidable member revoluble therewith provided with threads the threads of said slidable members extending in opposite directions; and a driving member freely revoluble on each of said hubs and provided with threads co-operating with said slidable member and adapted to operate it to regulate the driving of said wheel hub.

6. The combination with an axle; of a wheel hub freely revoluble on each end of said axle; a grooved member secured to each hub; a friction member in each groove provided with an external thread, the threads of the two members inclining in opposite directions; and a driving member provided with internal threads co-operating with each of said friction members.

7. The combination with an axle; of a wheel hub freely revoluble on each end of said axle; a grooved member secured to each hub; a friction member in each groove provided with an external thread, the threads of the two members inclining in opposite directions and having an annular raceway in the inner periphery thereof; and a plurality of balls mounted in said raceway.

8. The combination with an axle; of a wheel hub freely revoluble on each end of said axle; a grooved member secured to each hub provided with an annular raceway of greater width than the balls therein; a friction member in each groove provided with an external thread, the threads of the two members inclining in opposite directions and having an annular raceway in the inner periphery thereof; and a plurality of balls mounted in said raceway.

9. The combination with an axle; of a wheel hub freely revoluble on each end of said axle; a grooved member secured to each hub; a friction member in each groove provided with an external thread, the threads of the two members inclining in opposite directions; a corrugated member co-operating with said friction member to prevent its free revolution; and a driving member provided with internal threads co-operating with each of said friction members.

10. The combination with an axle; of a wheel hub freely revoluble on each end of said axle; a grooved member secured to each hub; a friction member in each groove provided with an external thread, the threads of the two members inclining in opposite directions; a corrugated split ring in a recess in said friction member to prevent its free revolution; and a driving member provided with internal threads co-operating with each of said friction members.

11. The combination with an axle; of a wheel hub revoluble on the end thereof; a driving member freely revoluble on anti-friction members in a groove in said hub; a friction member also mounted upon anti-friction members in said groove and revoluble with said driving member under certain conditions; and means for preventing the concurrent movement of said driving member and said friction member under other conditions.

12. The combination with an axle; of a wheel hub revoluble on the end thereof; a driving member freely revoluble in a groove in said hub; a friction member also mounted in said groove and revoluble with said driving member under certain conditions; and means for preventing the concurrent movement of said driving member and said friction member under other conditions.

13. The combination with an axle; of a wheel hub revoluble on the end thereof; a driving member freely revoluble in a groove in said hub; a friction member also mounted in said groove and provided with means engaging said driving member to cause the two members to revolve concurrently under certain conditions but permit them to act independently under other conditions; and means for preventing the concurrent movement of said members.

14. The combination with an axle; of a wheel hub revoluble on the end thereof; a driving member freely revoluble in a groove in said hub; a friction member also mounted in said groove and provided with peripheral means engaging said driving member to cause the two members to revolve concurrently under certain conditions but permit them to act independently under other conditions; and means for preventing the concurrent movement of said members.

15. The combination with an axle; of a wheel hub provided with an annular peripheral groove; a driving member revoluble therein and extending beyond the periphery of said hub; and a driven member also therein operated upon by said driving member to cause it to move laterally to impinge upon the wall of said groove.

16. The combination with an axle; of a wheel hub revoluble thereon provided with an annular peripheral groove; a driving member revoluble therein and extending beyond the periphery of said hub; and a driven member actuated thereby to impart the movement of said driving member in either direction to said hub.

Signed by me at Rome, N. Y. this 10 day of May 1906. 1906.

CLARENCE U. HAYNES.

Witnesses:
OSWALD R. BACKUS,
WILLIAM M. ARTHUR.